United States Patent [19]

Iovine et al.

[11] 4,448,935
[45] May 15, 1984

[54] PROCESS FOR THE PREPARATION OF CROSSLINKED, SULFONATED STYRENE POLYMERS

[75] Inventors: Carmine P. Iovine; Dilip K. Ray-Chaudhuri, both of Bridgewater, N.J.

[73] Assignee: National Starch and Chemical Corporation, Bridgewater, N.J.

[21] Appl. No.: 400,216

[22] Filed: Jul. 21, 1982

Related U.S. Application Data

[63] Continuation-in-part of Ser. No. 878,204, Feb. 16, 1978, abandoned, which is a continuation-in-part of Ser. No. 694,785, Jun. 10, 1976, abandoned.

[51] Int. Cl.³ .............................. C08F 8/36; C08F 8/00
[52] U.S. Cl. .................................... 525/343; 525/344; 525/359.3; 525/359.5; 525/384
[58] Field of Search ............ 525/344, 343, 384, 359.3, 525/359.5

[56] References Cited

U.S. PATENT DOCUMENTS 3,423,335 1/1969 Phillips .................................. 525/384
3,560,428 2/1971 Bilow .................................... 525/384

FOREIGN PATENT DOCUMENTS 2045096 3/1971 Fed. Rep. of Germany ... 525/359.5

OTHER PUBLICATIONS

Royals, E. E., Advanced Organic Chem., Prentice Hall, N.J., p. 469 (1956).

Primary Examiner—C. A. Henderson
Attorney, Agent, or Firm—Edwin Szala; Margaret Kelley

[57] ABSTRACT

Polystyrene and styrene copolymers are simultaneously crosslinked and sulfonated in a homogeneous reaction mixture by incorporation of from 0.1 to 5 mole percent of specific crosslinking reagents in the polymer sulfonating solution. The crosslinking reagents are selected aryl compounds having at least two —CH$_2$X radicals where X is hydroxyl, chlorine or bromine.

7 Claims, 1 Drawing Figure

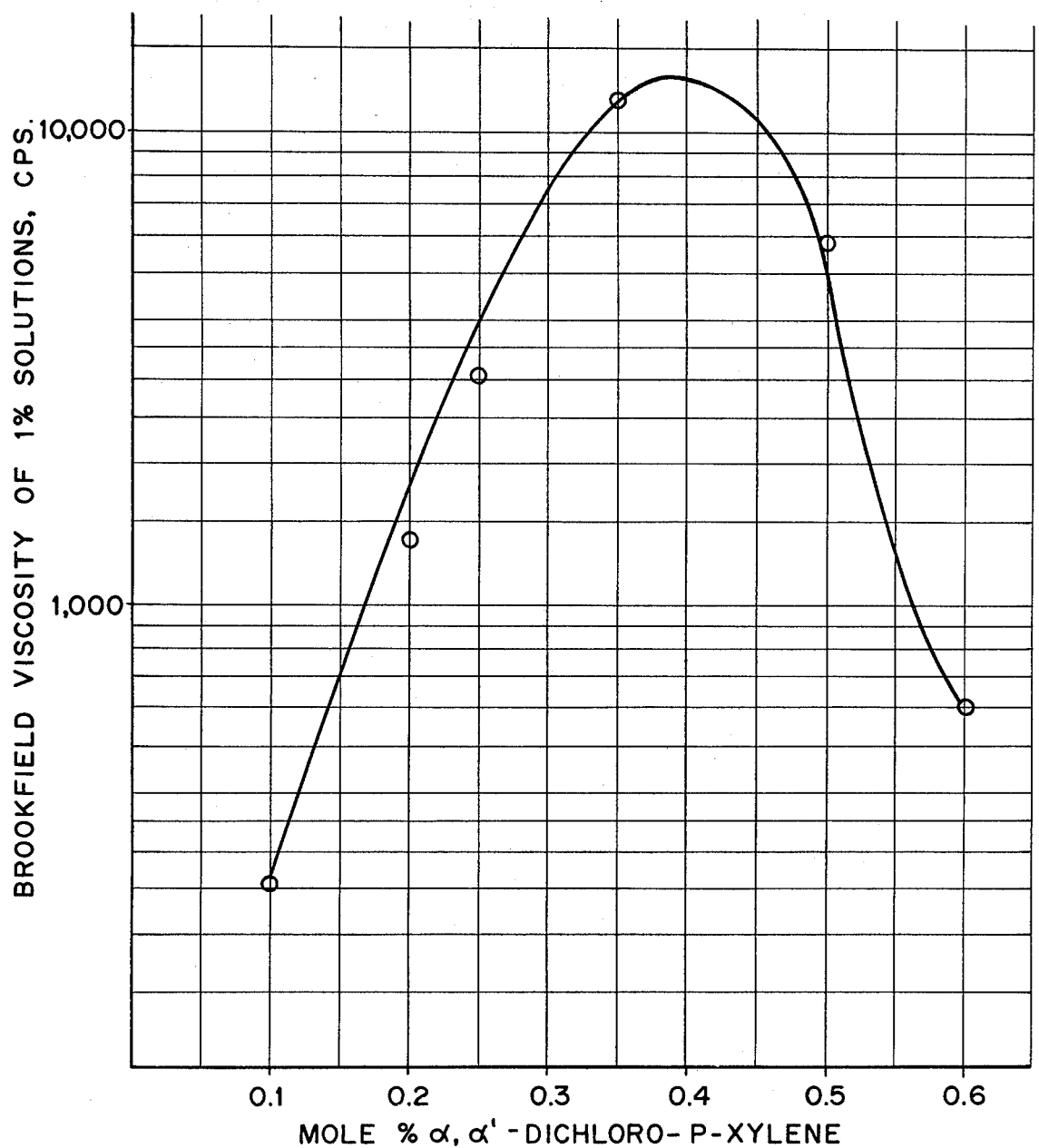

PROCESS FOR THE PREPARATION OF CROSSLINKED, SULFONATED STYRENE POLYMERS

This application is a continuation-in-part of our copending U.S. application Ser. No. 878,204 filed Feb. 16, 1978, now abandoned, which was a continuation-in-part of U.S. application Ser. No. 694,785 filed June 10, 1976, now abandoned.

BACKGROUND OF THE INVENTION

I. Field of the Invention

This invention relates to new crosslinked sulfonated polymers of polystyrene and styrene copolymers and to a process for the production thereof. More particularly, the invention relates to a process for producing crosslinked sulfonated polystyrene or styrene copolymers employing selected crosslinking agents during the sulfonation reaction so as to achieve crosslinking and sulfonation of the polymer simultaneously and efficiently in a homogeneous system. The process yields crosslinked sulfonated styrene polymers undisclosed in the prior art.

II. Brief Description of the Prior Art

Prior art procedures for preparing crosslinked sulfonated polystyrene or styrene copolymers involve the sulfonation of polymers which have been previously crosslinked with difunctional reagents or which contain copolymerized alkenyl halides within the backbone of the polymer itself. The crosslinking may then be achieved during formation of the polymer as is the case when styrene divinyl aryl compounds are sulfonated. Typical of such methods is that described by Davankov et al. in German Offen. No. 2,045,096 (Chem. Abs. 75, 6841v). Alternatively, the styrene polymers may contain therein an alkenyl halide together with a Friedel-Crafts type catalyst, which, upon exposure to elevated temperatures during sulfonation, will effect crosslinking so as to produce the sulfonated crosslinked polymer. The latter method is described in U.S. Pat. No. 2,628,193.

The methods of the prior art thus, in all cases, require the presence of specific components within the backbone of the polymer thereby limiting the choice of molecular weight and final structure of the sulfonated polymer. Moreover, in cases wherein the polymer is crosslinked prior to sulfonation, the degree of crosslinking desired in the final polymer must be incorporated into the starting polystyrene copolymer. Often, however, a high crosslinking density is desired in the final product and this necessitates working with a styrene polymer which is insoluble in the sulfonation medium resulting in incomplete or partial sulfonation. Similarly, incomplete sulfonation is achieved when alkenyl halides or the like are incorporated into the polymer since the aromatic sites available for sulfonation are proportionately reduced.

SUMMARY OF THE INVENTION

In accordance with the present invention, polystyrene or styrene copolymers of molecular weight 800 to 4,000,000 can be crosslinked to any degree of water solubility during sulfonation from a homogeneous reaction mixture by incorporation of from 0.1 to 5 mole % of specific crosslinking reagents in the styrene polymer sulfonating solution. These crosslinking reagents are not part of the polymer backbone and are activated only by the sulfonating reagent. Consequently, these reagents do not interact with the styrene polymer until the latter enters the sulfonation zone, thereby effecting simultaneous sulfonation and crosslinking in a homogeneous system wherein the polymer itself is soluble throughout the reaction.

The resultant crosslinks are covalent carbon bonds which are heat-stable, reproducible and not subject to hydrolysis; properties difficult to obtain using procedures of the prior art.

Moreover, since the crosslinking agent is not part of the polymer backbone, the same styrene substrate can be used to produce soluble chain extended sulfonates, insoluble sulfonates or sulfonates having any degree of solubility between these extremes simply by adjusting the amount of crosslinking reagent used. For the same reason, sulfonated polystyrenes can be prepared over a wide range of molecular weights from the same styrene substrate by varying the amount of crosslinking reagent. In addition, since sulfonation occurs in a homogeneous phase simultaneously with crosslinking, virtually complete substitution of the aromatic groups of the polymer with respect to sulfonic acid groups can be achieved.

Thus, the process of the present invention enables the production of a sulfonated, crosslinked polystyrene or styrene copolymer in which the final molecular weight, degree of crosslinking and degree of sulfonation can be selected independently of each other. Moreover, the present invention provides a method for the production of polystyrene and styrene copolymers which are fully sulfonated with respect to the available aromatic groups; such fully sulfonated materials could not be produced using the methods of the prior art.

BRIEF DESCRIPTION OF THE DRAWING

The single FIGURE is a graph illustrating the wide variety of viscosities (and hence wide range of solubilities) obtainable from one specific polystyrene substrate using controlled amounts of $\alpha,\alpha'$-dichloro-p-xylene, one of the crosslinking reagents disclosed herein.

DETAILED DESCRIPTION OF THE PREFERRED EMBODIMENTS

The homopolymers and copolymers of styrene suitable for use herein include those polymers having a styrene content of at least about 5% by weight, preferably at least 25% by weight, exhibiting solubility in the sulfonation solvent and having a molecular weight within the range of about 800 to 4,000,000.

Copolymerizable comonomers suitable for use with the styrene include, for example, alkyl ($C_1$–$C_{18}$) acrylates and methacrylates, maleic anhydride, maleic acid esters, fumaric acid esters, acrylonitrile and olefins, e.g. ethyl acrylate, methyl methacrylate, dimethyl maleate, isobutylene, butyl acrylate, etc.

Additionally, aromatic comonomers capable of copolymerizing with the styrene may be employed. Such comonomers include the vinyl aryl compounds such as vinyl naphthalene, vinyl diphenyl, vinyl fluorene, etc. and their nuclear-substituted derivatives such as alkyl, aryl, alkaryl, aralkyl, cycloalkyl, alkoxy, aryloxy, chloro, fluoro, chloromethyl, fluoromethyl and trifluoromethyl nuclear derivatives, for example methyl-styrene, etc; alpha-alkyl-vinyl substituted aromatic compounds such as these substituted with isopropenyl or alpha-methyl-vinyl, alpha-ethyl-vinyl, alpha-propyl-vinyl radicals, etc. It will be recognized that when such aromatic comonomers are polymerized with the styrene and treated in accordance with the present invention, sulfonation of the aromatic groups of the comonomers in addition to sulfonation of the styrene will also occur. It will also be recognized by those skilled in the art that by requiring the copolymers to be soluble in the sulfonating reagent, such previously crosslinked polymers as would result from copolymerization with difunctional compounds, such as diacrylates, divinyl aromatics and diallyl compounds, would be excluded from the scope of the invention.

The specific crosslinking agents employed in the practice of this invention are selected aryl compounds having at least two radicals of the following structure:

—CH$_2$X wherein X is selected from the group consisting of —OH, —Cl and —Br. More particularly, the useful crosslinking agents are defined by the following generic structures:

(i)

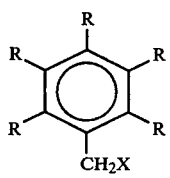

wherein at least one R is selected from the group consisting of:

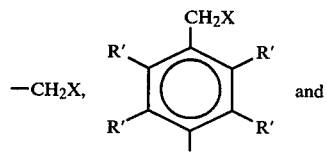

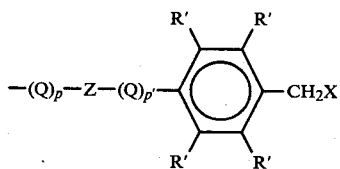

where X is —OH, —Cl or —Br; Q is oxygen or sulfur; p and p' are independently selected integers having the value 0 or 1; Z is a radical containing from 1 to 10 carbon atoms inclusive and is selected from the group consisting of straight and branched chain alkylene radicals; and the remaining R and R' are selected from the group consisting of hydrogen, C$_1$–C$_3$ alkyl and C$_1$–C$_3$ alkoxy radicals; and (ii) polynuclear aryl compounds containing at least two —CH$_2$X groups wherein X is as defined above, which compounds may be further substituted with substituent groups selected from the group consisting of —OH, C$_1$–C$_3$ alkyl radicals and C$_1$–C$_3$ alkoxy radicals.

It is to be noted that the positioning of the functional CH$_2$X groups on the above-described reagents is not critical to the efficacy of the crosslinking reagent.

Illustrative crosslinking reagents include:

α,α'-dichloro-xylenes:

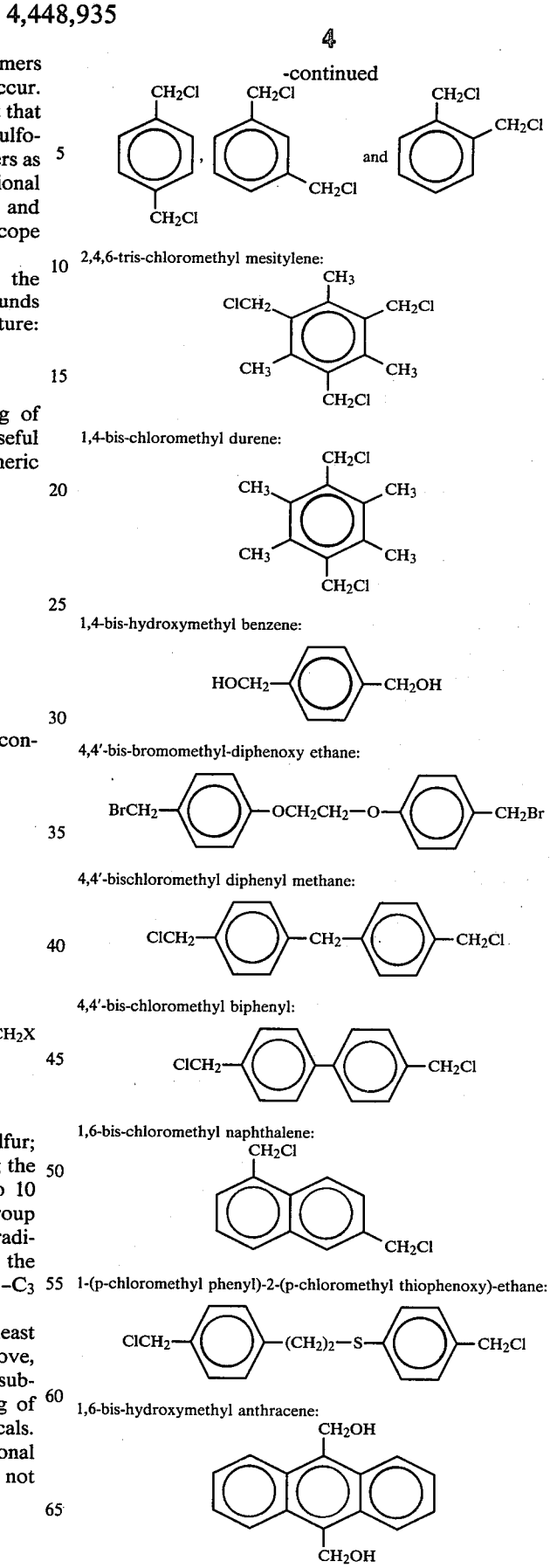

The amount of the crosslinking reagent employed will vary depending upon a number of factors including the nature of the specific reagent and of the copolymer substrate, the molecular weight desired in the final product and the level of solubility or insolubility desired in the final product. In general, levels of 0.1 to 5 mole % of the crosslinking agents based on the aromatic content of the styrene component may be employed, although levels of less than about 1.5% are preferred. The lower levels of crosslinking will result in water-soluble polymers while the higher levels will result in water-insoluble sulfonated polymers useful, for example, as ion exchange resins.

Any sulfonation reagent conventionally employed for the sulfonation of styrene-containing polymers may be used. Suitable reagents include sulfur trioxide, oleum, halosulfonic acids and sulfur trioxide addition compounds. Among the applicable addition compounds of sulfur trioxide are included the complexes of sulfur trioxide with complexing agents such as pyridine, trialkyl amines, dimethyl formamide, ethers, e.g. bis-2-chloroethyl ether and dioxane, trialkyl phosphates and phosphites. These reagents are well known to those skilled in the art and are described in various texts dealing with aromatic sulfonation, e.g. E. E. Gilbert "Sulfonation and Related Reactions", Interscience Publishers, N.Y. (1965). The preferred class of sulfonation reagents is derived from the addition compounds of sulfur trioxide and trialkyl ($C_1$-$C_{18}$) phosphates. The preparation of such addition products and the sulfonation therewith are described in U.S. Pat. Nos. 3,072,703 and 3,072,618, respectively, the disclosures of which are included herein by reference.

The amount of sulfonating reagent employed will also vary over a wide range depending upon a number of factors such as the reagents and substrate employed, and the solubility and degree of sulfonation desired in the final product. If a fully substituted sulfonated styrene polymer or copolymer is desired, the amount of sulfonating reagent employed must be at least equimolar to the number of moles of available aromatic-containing components.

The sulfonation and crosslinking conditions are those conventionally employed in sulfonation reactions. Thus, any aliphatic hydrocarbons or chlorinated hydrocarbons which are not reactive with the sulfonating reagent may be used as solvent. Preferably, 1,2-dichloroethane is used as a solvent medium but other solvents known to be useful in these sulfonating reactions may also be employed.

Although reaction conditions may be varied and adapted to particular industrial situations, the following general preparative procedure may be considered as illustrative. The polystyrene or styrene copolymer is dissolved in 1,2-dichloroethane such that the concentration of the polymer in the solvent is in the range of 1-50% by weight. To this solution is added a suitable amount of the crosslinking agent. The mixture is agitated until the polymer and crosslinking agent dissolve. The resultant polymer solution is then added simultaneously with the sulfonating reagent to a reaction vessel containing precharged solvent and complexing agent if the sulfonating addition product is to be formed in situ. The reactions occur immediately and the temperature is maintained at 5°–25° C. by cooling. As the product forms, it precipitates from the reaction mixture.

The product is then isolated according to any of the suitable procedures described in the art as, for example, by filtration or extraction with water if the acid form is desired or by neutralization if the salt form is desired or by stabilization with alkali metal carbonates and filtration.

Since the chemical nature of the crosslinking agent, the amount of crosslinking agent employed and the styrene substrate are all variables, it is not possible to represent the crosslinked sulfonated polystyrene or styrene copolymers by a single structure and they may only be considered to be defined by the process disclosed herein for their production. However, if a typical crosslinking agent is considered, then the basic type of structural units involved in the practice of the present invention may be characterized.

Thus, if polystyrene of average molecular weight 250,000 (degree of polymerization 2404) were crosslinked and sulfonated using 0.25 mole percent $\alpha,\alpha'$-dichloro-p-xylene in a sulfonating medium in accordance with the present invention, a typical resultant product could be represented by the following structure:

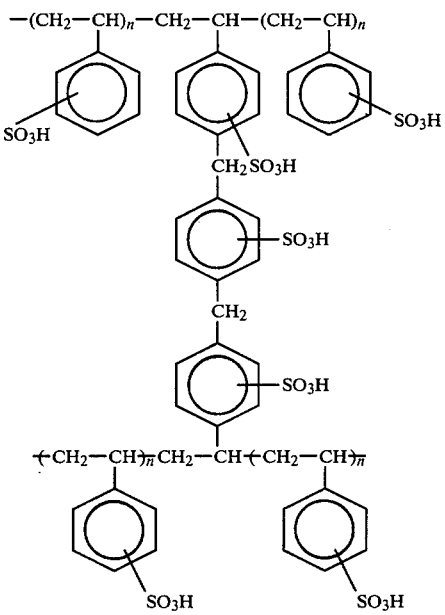

The examples which follow are illustrative and the scope of the invention is not to be considered as limited thereto. In the examples, all parts are by weight unless otherwise noted.

EXAMPLE I

This example illustrates a general process used to prepare the crosslinked sulfonated polystyrenes of the invention.

A one liter 3 neck flask equipped with a mechanical agitator, condenser and drying tube, was charged with 900 gms. of 1,2-dichloroethane and 0.175 gms. $\alpha,\alpha'$-dichloro-p-xylene. With stirring, 100 gms. of dry powdered polystyrene having a molecular weight of 480,000 was added. The mixture was stirred until all the polystyrene had dissolved. This was designated solution "A".

The sulfonation vessel, a 5-liter Morton flask equipped with an agitator, thermometer, condenser with drying tube and a gas inlet tube, was purged with dry nitrogen for one hour. To the reactor was added 1250 gms. 1,2-dichloroethane at 0.009% $H_2O$ and 35 gms. triethyl phosphate. The temperature of the reaction mixture was maintained at 15°-20° C. while 15.82 gms. SO₃ (liquid, stabilized) was slowly added. This amount of SO₃ was sufficient to form a 1:1 molar complex with the triethyl phosphate.

When the temperature stabilized, the simultaneous addition of solution A (820 ml) and 77.5 gms. (42 ml) stabilized SO₃ was started. The addition rates were maintained at 20 ml/minute for "A" and 1 ml/minute for the SO₃. The temperature during sulfonation was maintained at 15°-21° C. The sulfonated polystyrene precipitated as it formed.

As a control, this same procedure was repeated with the elimination of the 0.175 gms. of α,α'-dichloro-p-xylene from the stock solution "A".

Both polymers were evaluated to determine the extent of crosslinking by measuring the Brookfield (RVF) viscosity of 5% solutions in water:

|  | Viscosity | Degree of Sulfonation |
|---|---|---|
| Control | 100 cps | 0.943 |
| Crosslinked | 2080 cps | 0.939 |

EXAMPLE II

This example illustrates how this process lends itself to the preparation of sulfonated polystyrenes having widely different solution properties by simply adjusting the level of crosslinking agent used in the sulfonation of the same base polystyrene. The results obtained in this example are illustrated by the graph in the FIGURE.

General Procedure

A stock solution for sulfonation was prepared by dissolving 220 gms. of polystyrene (molecular weight 250,000) and the desired amount of α,α'-dichloro-p-xylene in 1980 gms. 1,2-dichloroethane containing 0.008% water.

A five-liter Morton vessel equipped with stainless steel agitator, thermometer, condenser with drying tube and a gas inlet adapter, was purged for one hour with dry nitrogen. Thereupon, 2500 gms. 1,2-dichloroethane and 23.3 gms. triethyl phosphate was added to the reactor and the temperature lowered to 15° C.

With cooling, 11.14 gms. stabilized SO₃ was dropped into the reactor in order to form a 1:1 complex with the phosphate. When the temperature stabilized, the addition of 2000 gms. (1640 ml) of the stock solution containing polystyrene and crosslinker was started. Simultaneously, the addition of 154.6 gms. (83.5 ml) of stabilized SO₃ was also started. The rate of the stock solution was 20 ml/min. and the SO₃ rate was adjusted to 1 ml/min. During the additions, the temperature was maintained at 15°-20° C. by cooling. As the crosslinked sulfonated polystyrene forms, it precipitated from solution.

When the sulfonation was completed, 143 gms. of pulverized sodium carbonate monohydrate was added to the reactor and the mixture stirred for 1 hour. The stabilized product was isolated by filtration and drying at 60° C. for 2 hours. The sulfonated polymer was characterized by preparing a 1% aqueous solution and measuring the Brookfield viscosity at room temperature. The data is tabulated in Table I and plotted in the FIGURE.

TABLE I

| Experiment | Mole % Crosslinker | Brookfield Viscosity at 1% | Type |
|---|---|---|---|
| A | 0 | 35 cps | Clear Solution |
| B | 0.10 | 250 cps | Clear Solution |
| C | 0.20 | 1,350 cps | Clear Solution |
| D | 0.25 | 3,000 cps | Clear Solution |
| E | 0.35 | 11,680 cps | Slight Grain |
| F | 0.50 | 5,800 cps | Moderate Grain |
| G | 0.60 | 390 cps | Heavily Grained |

EXAMPLE III

This example illustrates the wide selection in the choice of polystyrenes and crosslinking agents.

The general procedure described in Example II was repeated using a variety of polymers and copolymers in the amounts shown in Table II. The polymers employed were designated as follows:

Polymer A Polystyrene (MW 250,000)
Polymer B Polystyrene (MW $3 \times 10^6$)
Polymer C Polystyrene (MW 30,000)
Polymer D Copolymer of styrene and acrylonitrile (75% styrene, MW 300,000)
Polymer E Copolymer of styrene and methylmethacrylate (70% styrene, MW 287,000)
Polymer F Copolymer of styrene and maleic anhydride (76.1% styrene, MW 2,000)
Polymer G Polystyrene (MW 500,000)
Polymer H Copolymer of styrene and p-t-butyl styrene (39.6% styrene, MW 750,000)

The viscosity results obtained are tabulated in Table II.

EXAMPLE IV

This example illustrates the preparation of an insoluble crosslinked sulfonated polystyrene.

A stock solution is prepared by dissolving 220 gms. of polystyrene (molecular weight 250,000) and 5 gms. of 2,4,6-tris(chloromethyl)-mesitylene in 1980 gms. of 1,2-dichloroethane containing 0.008% in water.

A five liter reactor as described in Example II is purged for one hour with dry nitrogen. Thereupon, 2500 gms., 1,2-dichloroethane is added to the reactor and the temperature lowered to 15° C.

The addition of 2000 gms. (1640 ml) of the stock solution containing polystyrene and crosslinker is started. Simultaneously the addition of 154.6 gms. (83.5 ml) of stabilized SO₃ is also started. The rate of the stock solution is 20 ml/min. During the additions the temperature is maintained at 15°-20° C. by cooling. As the crosslinked sulfonated polystyrene forms, it precipitates from solution.

TABLE II

| Ingredients | | | | | | | | | |
|---|---|---|---|---|---|---|---|---|---|
| Polymer A | — | — | — | — | 50 | 50 | 200 | 200 | — |
| Polymer B | 75 | 75 | 75 | 75 | — | — | — | — | — |
| Polymer C | — | — | — | — | — | — | — | — | 200 |
| Polymer D | — | — | — | — | — | — | — | — | — |
| Polymer E | — | — | — | — | — | — | — | — | — |

TABLE II-continued

| | | | | | | | | | |
|---|---|---|---|---|---|---|---|---|---|
| Polymer F | — | — | — | — | — | — | — | — | — |
| Polymer G | — | — | — | — | — | — | — | — | — |
| Polymer H | — | — | — | — | — | — | — | — | — |
| α,α''-dichloro-p-xylene | 0.12 | 0.25 | 0.63 | 0.88 | — | — | — | — | 1 |
| 4,4'-bischloromethyl-diphenyl methane | — | — | — | — | 1.3 | — | — | — | — |
| 4,4'-bischloromethyl-diphenyl ethane | — | — | — | — | — | 1.4 | — | — | — |
| 1,4-bischloromethyl durene | — | — | — | — | — | — | — | 1.56 | — |
| p-xylene-α-α'-diol | — | — | — | — | — | — | 0.66 | — | — |
| 2,4,6-tris-(chloromethyl)-mesitylene | — | — | — | — | — | — | — | — | — |
| o,o'-bis-(bromomethyl) biphenyl | — | — | — | — | — | — | — | — | — |
| 1,4-bis-(α-chloro-p-tolyl)ether | — | — | — | — | — | — | — | — | — |
| 1,2-dichloroethane | 2350 | 2350 | 2350 | 2350 | 450 | 450 | 1800 | 1800 | 1800 |
| 1,2-dichloroethane (pre-charged) | 2500 | 2500 | 2500 | 2500 | 625 | 625 | 2500 | 2500 | 2500 |
| Triethylphosphate | 26.2 | 26.2 | 26.2 | 26.2 | 17.5 | 17.5 | 23.3 | 23 | 70 |
| SO$_3$ (Total) | 73.2 | 72.4 | 72.4 | 71.7 | 47.4 | 47.8 | 168.9 | 165.4 | 188.4 |
| Na$_2$CO$_3$H$_2$O | 72 | 70 | 70 | 66.2 | 45 | 46 | 147 | 142 | 179 |
| 1% Viscosity cps | — | — | — | — | — | — | 3600 | — | — |
| 2.5% Viscosity cps | — | — | — | — | 2500 | 3000 | — | 5300 | — |
| 0.5% Viscosity cps | 800 | 1825 | 7500 | 10,500 | — | — | — | — | — |
| Control | 400 | 400 | 400 | 400 | 15 | 15 | 38 | 38 | 15 |
| 5% Viscosity cps | — | — | — | — | — | — | — | — | 200 |

| Ingredients | | | | | | | | |
|---|---|---|---|---|---|---|---|---|
| Polymer A | — | — | 200 | 200 | 50 | — | — | — |
| Polymer B | — | — | — | — | — | — | — | — |
| Polymer C | — | — | — | — | — | — | — | — |
| Polymer D | 100 | — | — | — | — | — | — | — |
| Polymer E | — | 200 | — | — | — | — | — | — |
| Polymer F | — | — | — | — | — | — | 200 | — |
| Polymer G | — | — | — | — | — | 100 | — | — |
| Polymer H | — | — | — | — | — | — | — | 200 |
| α,α'-dichloro-p-xylene | — | 1.18 | — | — | — | 0.175 | — | 0.26 |
| 4,4'-bischloromethyl-diphenyl methane | — | — | — | — | — | — | — | — |
| 4,4'-bischloromethyl-diphenyl ethane | — | — | — | — | — | — | — | — |
| 1,4-bischloromethyl durene | — | — | — | — | — | — | — | — |
| p-xylene-α,α'-diol | — | — | — | — | — | — | — | — |
| 2,4,6-tris(chloromethyl)-mesitylene | — | — | 0.51 | — | — | — | — | — |
| o,o'-bis-(bromomethyl)biphenyl | — | — | — | — | 1.6 | — | — | — |
| 1,4-bis(α-chloro-p-tolyl)ether | — | — | — | 0.51 | — | — | — | — |
| 1,2-dichloroethane | 1080 | 1986 | 1800 | 1800 | 450 | 1900 | 1840 | 1800 |
| 1,2-dichloroethane (pre-charged) | 1250 | 2500 | 2500 | 2500 | 650 | 1250 | 1250 | 2500 |
| Triethylphosphate | 10 | 48.9 | 23.3 | 23.3 | 175 | 35 | 26.6 | 27.6 |
| SO$_3$ (Total) | 93.3 | 131.1 | 165.7 | 165.7 | 47 | 51 | 74.3 | 94 |
| Na$_2$CO$_3$H$_2$O | 62.3 | 124 | 143 | 143 | 44.8 | 189 | — | 234 |
| 1% Viscosity cps | — | 330 | 1000 | 400 | — | — | — | 1250 |
| 2.5% Viscosity cps | 9800 | — | — | — | 2700 | — | — | — |
| 0.5% Viscosity cps | — | — | — | — | — | — | — | — |
| Control | — | — | 38 | 38 | 15 | 100 | — | 150 |
| 5% Viscosity cps | — | — | — | — | — | 2080 | — | — |

After the sulfonation the polymer is filtered and washed once with methanol and then resuspended in water. The polymer is fully crosslinked and will exhibit no significant solution viscosity. Hence, the resultant crosslinked material would be characterized by an approximate D.S. of 0.90–0.95 which would correspond to an exchange capacity of 5 meq/gm. (dry basis) rendering the polymer very well suited for ion exchange uses.

EXAMPLE V

This example illustrates the use of a different sulfonating system in the production of the crosslinked sulfonated polystyrenes of the present invention.

A stock solution is prepared containing 220 gms. Polymer A, 1980 gms. 1,2-dichloroethane and 0.37 gms. α,α'-dichloro-p-xylene.

A complexed sulfonating reagent is prepared as follows:

A 2 liter round bottom flask fitted with a glass/teflon agitator, nitrogen sweep, thermometer, condenser and drying tube is charged with 277.4 gms. of bis(beta chloroethylether) and 1000 gms. 1,2-dichloroethane. With cooling so as to maintain the temperature at 15°–20° C., 155.3 gms. SO$_3$ is added to the mixture over a 1 hour period.

A 5-liter Morton flask as described in Example I charged with 1000 gms. of 1,2-dichloroethane. With cooling, 2000 gms. of the polymer solution, and the sulfonating reagent solution added simultaneously over a 2 hour period. The reaction temperature is maintained at 15°–20° C. After the sulfonation, the mixture is stirred 30 minutes and then 216 gms. sodium carbonate added.

The stabilized polymer is recovered by filtration and drying. A 1% solution of the final product in water will exhibit a Brookfield viscosity of approximately 235 cps compared to 35 cps for the control.

EXAMPLE VI

Using the general procedure described in Example I the following polymers can also be sulfonated using the amount of reagents designated:

(a) 200 parts of 90/10 copolymer of methylmethacrylate and styrene with 2.22 parts 1,4-bis-chloromethyl durene and 22.4 parts of chlorosulfonic acid. The product will be crosslinked and water swellable.

(b) 100 parts of an 80/20 copolymer of isobutylene and styrene with 15.4 parts SO$_3$, 3.5 parts triethyl phosphate and 1.7 parts, 2,2′-dichloro-p-xylene. The product will be crosslinked and water swellable.

EXAMPLE VII (Comparative)

This example illustrates the ineffectiveness of the multi-step reaction taught by Davankov et al. in crosslinking and sulfonating styrene polymers under the moderate reaction conditions taught by the present invention.

Using the general procedures of Example I above, 150 grams of polystyrene (avg. molecular weight 250,000), 1,350 grams of 1,2-dichloro-ethane and varying amounts of α,α′-dichloro-p-xylene were charged into a 2 liter round bottom flask fitted with stainless steel agitator, thermometer and condenser. Next, various amounts of aluminum chloride were added with 45 grams of 1,2-dichloroethane to the polystyrene solution at room temperature. The temperature was raised to 30°–35° C. and held for 2 hours. At the end of the reaction period, the temperature was lowered to 25° C. and 10 ml. of 10% aqueous hydrochloric acid was added to deactivate the aluminum chloride. The polystyrene was precipitated in methanol for purification, then ground and dried in a forced air oven at 80° C. for 12 hours. The amounts of α,α′-dichloro-p-xylene and aluminum chloride used (mole percent based on styrene), as well as the intrinsic viscosity of the resultant crosslinked material is shown below:

| Formulation | α,α′-Dichloro-p-xylene | Al(Cl)$_3$ | I.V. |
|---|---|---|---|
| A | 0.1 | 0.1 | 0.66 |
| B | 0.35 | 0.35 | 0.71 |
| C | 1.0 | 1.57 | Highly crosslinked |
| Polystrene (control) | 0 | 0 | 0.68 |

As the above results (I.V. values) indicate, little or no crosslinking occurred at the 0.1 and 0.35 levels of α,α′-dichloro-p-xylene under the instant reaction conditions.

All of the resultant crosslinked materials were then subject to sulfonation as described in Example II above. After sulfonation Formulation A exhibited an RVF viscosity in 1% solution of 52.5 cps and Formulation B had a viscosity of 60 cps. Formulation C could not be sulfonated since it was not sufficiently soluble in the dichloroethane.

From the examples presented hereinabove, it is apparent that the simultaneous crosslinking and sulfonation achieved by the process of the present invention is superior to that achieved by the multi-step processes of the prior art in many respects. Thus, the process described herein requires milder heating conditions as compared to prior processes as represented by Davankov et al., noted hereinabove. Where Davankov shows in his working example that the crosslinking is carried out for 4 hours at 60° C. and the sulfonation is thereafter effected by heating for 3 hours at 80° C., herein the working examples in contrast generally use a temperature range of 15°–21° C. and the reaction time is generally less than 2 hours to effect both crosslinking and sulfonation. The coaction of the combined steps provides a sulfonation substrate which is soluble in the reaction solvent whereas the prior art sulfonates a relatively insoluble polymer. Moreover, the crosslinking efficiency of the present process is improved as compared to Davankov. In each of the Davankov working examples showing the preparation of an insoluble crosslinked polystyrene, which polymer is useful as an ion-exchange resin, 1 m mole of crosslinking reagent is required for 10 m moles of polystyrene. On a proportion basis it is seen that 10 mole percent of crosslinking agent is used. In Example IV where the sulfonated polymer product is highly crosslinked and suited for ion-exchange purposes, 220 g. of polystyrene is used with 5 g. of 2,4,6-tris(chloromethyl)mesitylene which calculates to about 1.06 mole percent of crosslinking agent to produce a comparable highly crosslinked product. Finally, the present process is more economical when compared with the prior art since a single styrene substrate can be used to produce soluble, chain extended sulfonates, insoluble sulfonates or sulfonates having any degree of solubility between these extremes simply by adjusting the amount of crosslinking agent employed in the crosslinking/sulfonation reaction. In contrast, the prior art processes require a separate crosslinking step for the production of each of several crosslinked polymers of varying solubilities.

EXAMPLE VIII (Comparative)

This example was performed in order to show that there is coaction between the crosslinking reagent, sulfonating reagent and substrate polymer in the present process and that not all crosslinking reagents commonly used in the art and operating by Friedel-Crafts catalyst mechanism are useful herein.

Using the general procedures given in Examples I and II above, polystyrene (having an average molecular weight of 250,000) was sulfonated employing a complex of SO$_3$/triethyl phosphate in the presence of various crosslinking reagents as listed below, which reagents are known to be reactive when employed under Friedel-Crafts catalyst conditions. In each experiment no evidence of crosslinking was observed as determined by a comparison of solution viscosities for the "crosslinked" test polymer and a control polymer which was sulfonated in the absence of any crosslinking reagent.

| Crosslinking Agent | Amount |
|---|---|
| 1,4-dichlorobutene | 0.4 mole percent |
| terephthaloyl chloride | 1.6 mole percent |
| divinyl benzene | 2.0 mole percent. |

As will be recognized to those skilled in the art, variations may be made in ingredients, proportions and procedures as long as such variations are within the scope and spirit of the following claims.

We claim:

1. A process for the simultaneous crosslinking and sulfonation of polystyrene and styrene copolymers containing at least 5% by weight styrene and having a molecular weight of 800–4,000,000 comprising the steps of:
    (a) dissolving the polystyrene or styrene copolymer in an aliphatic hydrocarbon or chlorinated hydrocarbon as a sulfonating solvent;
    (b) adding thereto from 0.1 to 5 mole percent of a crosslinking reagent selected from the group consisting of:
        (i)

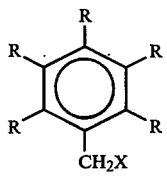

wherein one or two of the R substituents are selected from the group consisting of:

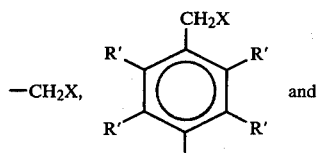

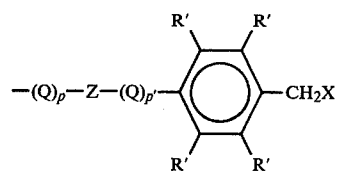

wherein X is —OH, —Cl, or —Br; Q is oxygen or sulfur; p and p' are independently selected integers having the value 0 or 1; Z is a radical containing from 1 to 10 carbon atoms inclusive and is selected from the group consisting of straight and branched chain alkylene radicals; and the remaining R and R' are selected from the group consisting of hydrogen, $C_1$–$C_3$ alkyl and $C_1$–$C_3$ alkoxy radicals; and (ii) polynuclear aryl compounds containing two or three —CH₂X groups wherein X is as defined above, which compounds may be further substituted with substituent groups selected from the group consisting of —OH, $C_1$–$C_3$ alkyl radicals and $C_1$–$C_3$ alkoxy radicals; and (c) adding the resultant solution to a sulfonating reagent derived from the addition of sulfur trioxide and a trialkyl phosphate while maintaining the reaction at a temperature of 5° to 25° C. whereby crosslinked sulfonated polymer is immediately precipitated; and (d) recovering the resultant precipitated crosslinked sulfonated polymer.

2. The process of claim 1 wherein the styrene is present in an amount of at least 25% by weight of the polymer.

3. The process of claim 1 wherein the crosslinking reagent is selected from the group consisting of α,α'-dichloro-xylenes, 2,4,6-trischloromethyl mesitylene, 1,4-bis-chloromethyl durene, 1,4-bis-hydroxymethyl benzene, 4,4'-bis-bromomethyl-diphenoxy ethane, 4,4'-bis-chloromethyl diphenyl methane, 4,4'-bis-chloromethyl biphenyl, 1,6-bis-chloromethyl naphthalene, 1-(p-chloromethyl phenyl)-2-(p-chloromethyl thiophenoxy)-ethane, and 1,6-bis-hydroxymethyl anthracene.

4. The process of claim 1 wherein the crosslinking reagent is used in an amount of 0.1 to 1.5 mole percent.

5. The process of claim 1 wherein the amount of sulfonating reagent employed is at least equimolar to the number of moles of available aromatic containing component and wherein the resultant polymer is fully substituted.

6. The process of claim 1 wherein the solvent is 1,2-dichloroethane.

7. The process of claim 1 wherein the sulfonating reagent is derived from the addition of sulfur trioxide and triethyl phosphate.

* * * * *